Patented Jan. 19, 1932

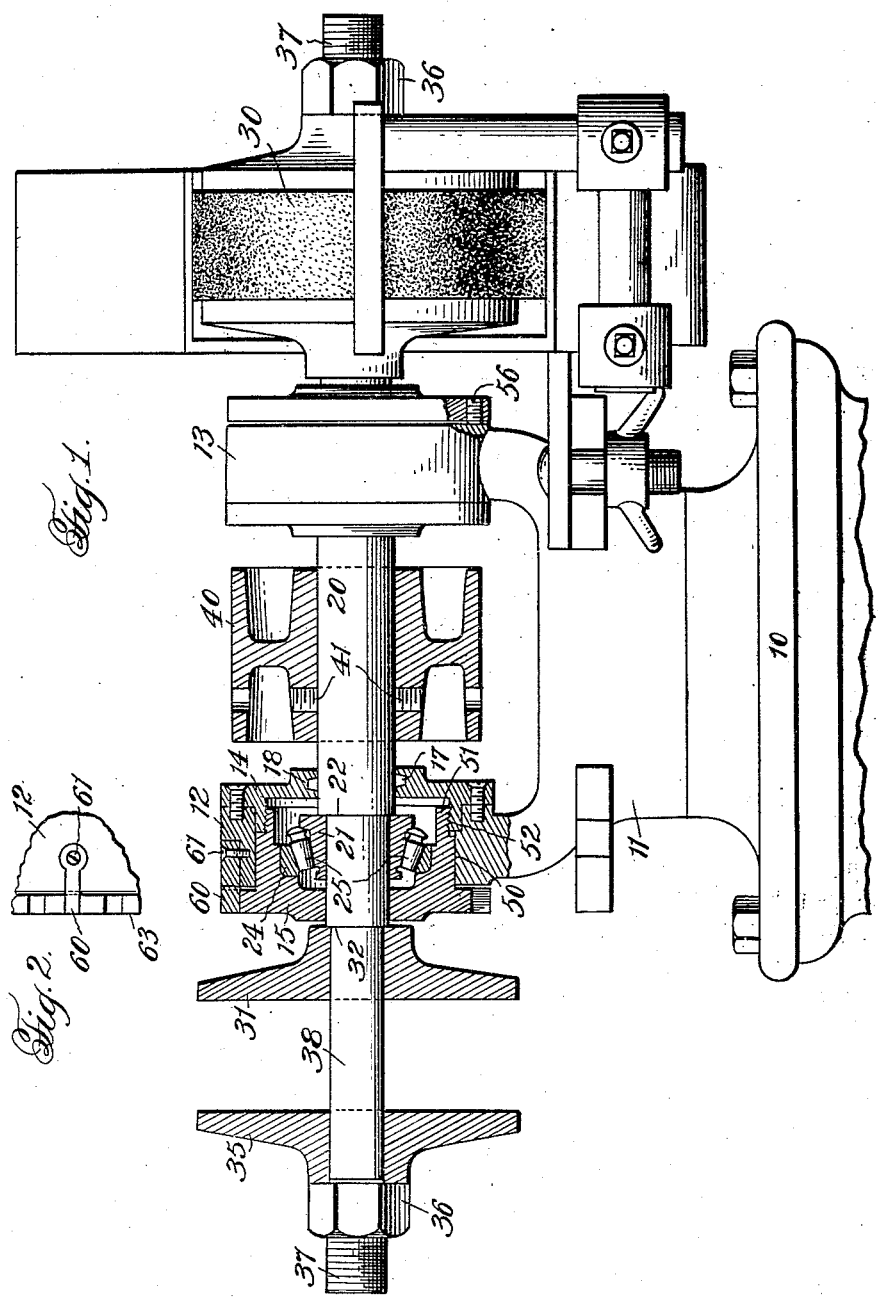

1,841,631

UNITED STATES PATENT OFFICE

CHARLES EDWIN RIFE, OF BALTIMORE, MARYLAND

ROLLER BEARING GRINDER

Application filed March 25, 1927. Serial No. 178,383.

This invention relates to bearings for disks that rotate at high speeds and in which the vibration must be kept at a minimum, and has for its principal object the provision of an emery wheel in which the spindle is much more rigid than in other forms, not only tending toward a materially longer life to the wheels themselves but increasing production to a marked degree.

A further object of the present invention is the provision of an abrasive disk mounting or bearing in which the abrasive disk is mounted to one side of both bearings, each of the latter being independently adjustable whereby a finer adjustment may be secured than possible where only one of the bearings is adjustable.

By actual test it has been found that the emery wheels on roller bearing grinders of the type illustrated have a life approximately 50% longer than with bearings of the type ordinarily considered to be best suited to grinders, and that more important still, the actual production is increased by proximately 25% since the spindle is extremely rigid and the wheels do not have to be trued so often.

The invention is illustrated in one particular embodiment for clarity of description but it should be borne in mind that the invention is not limited, except by the claims, to the specific device shown, for a single bearing could be used and the emery wheels could just as readily be abrasive disks of other types or cutting implements such as circular saws.

In the drawings:—

Figure 1 is an elevation partly in vertical section illustrating the invention in its preferred form.

Figure 2 is a top plan view of a portion of one of the bearings.

The base 10 supports a pedestal 11 ending in a yoke, the two arms 12 and 13 of which are integral annular guides which receive in permanent fashion the circular, inner end members 14, and slidably receive the outer end members 15 each of these members being grooved as at 17 to receive an oil tight packing 18. The shaft 20 carries a race ring 21 fitting against a shoulder 22 and the outer end member 15 carries a race ring 24, the two rings engaging a series of rollers 25 of old and well known type.

The abrasive disk 30 is secured between the fixed plate 31 which is in firm engagement with the shoulder 32, and the sliding plate 35 which is adjusted against the disk or abrasive wheel 30 by the usual nut 36 on the threaded end 37 of the spindle 38. The power receiving member here shown as a pulley 40 may be of any type but is preferably secured to the shaft 20 midway between the two bearings as for example by the set screws 41. The two inner end members 14 are, as stated, permanently secured to the hollow guides of the yoke which are integral with the pedestal 11, the fastening being of any desired form preferably the countersunk screws 45, so that to all intents and purposes the end pieces 14 may be considered substantially integral portions of the frame.

Each rotatable outer end member 15 has a cylindrical surface 50 engaging the guide 12 or 13 and an inwardly projecting threaded flange 51 which engages the threads 52 on the end pieces 14, these threads being of low pitch so that a full revolution of the end piece 15 will move the race rings 21 and 24 only a slight axial distance and that a very material change in angle will give as fine an adjustment as is required for substantial elimination of lateral movement of the spindles. Any desired means for holding the revolving end piece 15 with respect to the ring 12 may be used such for example as the set screw 56 shown at the bottom of the right bearing in Figure 1 but I prefer to have the more substantial form shown in Figure 2. In this mode of locking the end piece 15 to the ring 12 a key 60 is provided which fits snugly in a slot in the guide and is secured to the guide as by a screw 61 so that a substantial portion of the key projects over the outwardly extending annular flange 63 of the member 15, the flange being grooved at equi-spaced positions around its periphery to receive the key.

To adjust the device the two roller bearings are brought into approximate position and then both end pieces 15 are moved slowly until exact registry is had. It might be that with one member 15 stationary the bearings would be too tight if the other member 15 were moved one notch forward. In such case the other member 15 can be carried back one notch whereupon the one bearing 15 can be moved forward to the notch which would otherwise be too tight, the angular spacing of the notches being preferably different in the two end members. By this means an adjustment can be secured far in advance of any possible need, since, in addition to the different spacing, by having the two bearings the amount of relative movement of the rings is just half what it would be if there were but one bearing.

What I claim is:—

1. In combination, a rotary shaft, a three-piece support therefor comprising a central tubular member and a pair of end members engaging therewith and forming an oil chamber, a race ring on the shaft, a race ring on one end member, rollers between the rings and within said chamber, a threaded engagement between the two end members to alter the axial distance between the race ring and means for independently locking each end member to the central member.

2. In combination, a rotary shaft, two three-piece spaced supports therefor each comprising a central tubular member and a pair of end members engaging therewith and forming an oil chamber, a race ring on the shaft, a race ring on one end member, rollers between the rings and within said chamber, a threaded engagement between the two end members to alter the axial distance between the race ring and means for independently locking each end member to the central member.

3. A shouldered shaft, spaced roller bearings for said shaft each having a pair of race rings one of which abuts a shoulder, and means for lockingly adjusting each of the other race rings toward and away from the shoulder abutting race rings, said means being non-symmetrical in the two bearings whereby a finer lateral adjustment may be obtained.

4. The device of claim 3 in which the means on one bearing is of the key and slot type, the key being removably secured to a stationary portion of the bearing.

5. The device of claim 3 in which the means are a pair of members rotatable about the axis of the shaft and engaging a race ring and devices carried by stationary portions of the bearing for locking the members in chosen adjusted position.

6. The device of claim 3 in which the means are a pair of members rotatable about the axis of the shaft and engaging a race ring and devices carried by stationary portions of the bearing for locking the members in chosen position, said device being non-symmetrical whereby a finer adjustment may be had.

7. The device of claim 3 in which the means of each bearing includes a member having indentations equispaced about the axis of the shaft and a locking device carried by a stationary portion of the bearing, the members having their indentations spaced apart, one at one angular distance, and the other at a different angular distance.

8. In a roller bearing for a grinder having a shouldered shaft, a frame having a circular opening, a member snugly slidable on the smaller portion of the shaft and snugly slidable within the frame opening, a device snugly receiving the larger portion of the shaft and having a threaded engagement with the member, a race ring engaging the shoulder, a race ring engaging the member, rollers between the rings, and means for securing the device to the frame.

9. The bearing of claim 8 in which the member has peripheral slots, the frame has a slot with which the peripheral slots may be alined, and a key snugly fitting the alined slots.

In testimony whereof I affix my signature.
C. EDWIN RIFE.